United States Patent

[11] 3,588,646

| [72] | Inventors | Giovanni Zaffignani; |
| | | Gualtiero Mioc, Ivrea, Italy |
| [21] | Appl. No. | 764,139 |
| [22] | Filed | Oct. 1, 1968 |
| [45] | Patented | June 28, 1971 |
| [73] | Assignee | Ing. C. Olivetti & C., S.p.A. |
| | | Ivrea (Torino), Italy |
| [32] | Priority | Oct. 3, 1967 |
| [33] | | Italy |
| [31] | | 53223-A/67 |

[54] CONTROL CIRCUITS FOR ELECTRIC MOTORS
2 Claims, 1 Drawing Fig.

[52] U.S. Cl. .................................................. 318/221,
 318/225, 318/229
[51] Int. Cl. ..................................................... H02p 5/30
[50] Field of Search .......................................... 318/221,
 221.2, 221.5, 225, 229

[56] References Cited
UNITED STATES PATENTS

| 1,277,499 | 9/1918 | Stevens ...................... | 318/420 |
| 2,387,646 | 10/1945 | Crosman ..................... | 318/272 |
| 2,549,265 | 4/1951 | Trant .......................... | 318/221.5 |

*Primary Examiner*—Oris L. Rader
*Assistant Examiner*—K. L. Crosson
*Attorney*—Birch, Swindler, McKie & Beckett ABSTRACT: A control circuit for speed regulation of an asynchronous motor having at least a main and a second field winding and provided with a centrifugal switch which effectively inserts and takes out of circuit a ballast resistor in series with both said windings. In order to reduce the variations in speed in such a circuit a further centrifugal switch operates to insert an additional resistor in series with the main winding throughout the running condition of the motor.

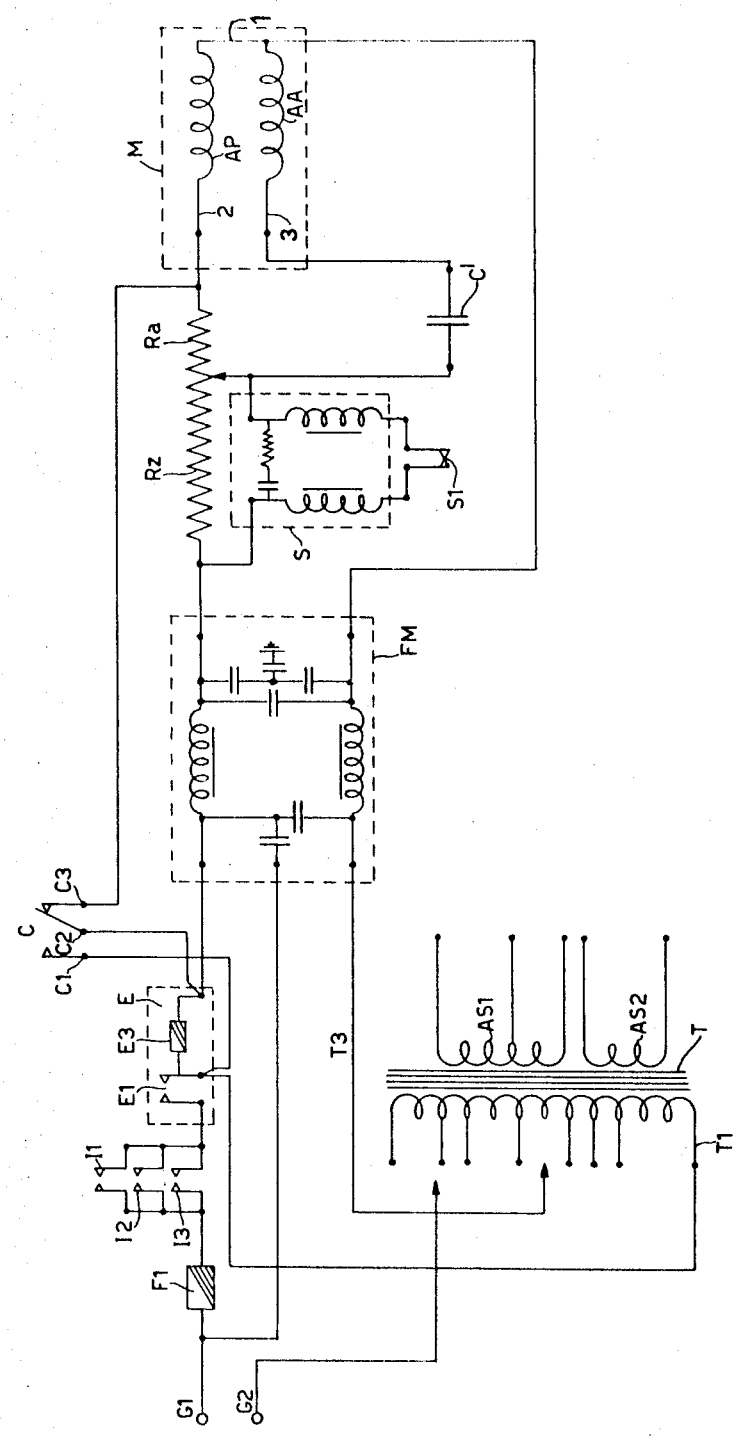

CONTROL CIRCUITS FOR ELECTRIC MOTORS

GENERAL DESCRIPTION

The present invention relates to the control circuits for electric motors, for example for the low power motors used in teleprinters, office machines or similar equipment.

In circuits of this type the speed regulation of the motor is usually obtained by means of selective insertion of a ballast resistor into the feeding circuit of the motor under the control of the contacts of a centrifugal governor. However, this method of regulation causes some oscillating in the motor speed variations which are intolerable in some circumstances. This is especially true in the case of application to teleprinters, wherein the variations in the motor speed may cause distortion of the telegraph signals.

The above-mentioned disadvantage is obviated by the circuit according to the invention, which is characterized in that the main winding carries in series therewith an additional resistance permanently inserted throughout the running condition of the motor.

DETAILED DESCRIPTION

This and other characteristics of the invention will become apparent from the following description of a preferred embodiment, made by way of example and not in a limiting sense, with reference to the accompanying drawing.

In the description that follows reference will be made to a circuit for regulation of the motor of a teleprinter machine. The modifications to be made to adapt the circuit for other applications will be obvious to the man of ordinary skill in the art.

The motor M is an asynchronous induction motor, provided with a main stator winding AP and an auxiliary stator winding AA.

The power supply for the motor is drawn from the power mains through the terminals G1 and G2, through an autotransformer T. More particularly, the terminal G1 feeds the fixed terminal T1 of the autotransformer T through a fuse F1, the contacts 11, 12, and 13 and the contacts E1 of a thermal switch E. The terminal G2 directly feeds the terminal T2 of the autotransformer T, which is constructed in the form of a movable contact for the regulation of the output voltage of the autotransformer in order to obtain the desired output voltage of the transformer with different mains voltages.

An end 1 of both windings AP and AA of the motor M is connected, through a filter FM to the output terminal T3 of the autotransformer, which is constructed in the form of a movable contact in order to regulate the supply voltage to the motor according to the desired selected transmission speed of the teleprinter (e.g., 100Baud, 75Baud, 50Baud). The secondary windings AS1 and AS2 of the autotransformer are adapted to supply voltages of suitable level for the members assigned to the different functions of the teleprinter.

The end 3 of the winding AA of the motor is connected to the mains terminal G1 through the capacitor C' (adapted to displace in phase the currents in the windings AA and AP as required for producing the stator rotary field of the motor M), the ballast resistor Rz, the filter FM, the thermal switch E, the contacts 11, 12 and 13 and the fuse F1.

The ballast resistor Rz cooperates with the contacts S1 of a centrifugal switch to regulate the speed of the motor about a predetermined theoretical speed. The contact S1 is provided with its own spark quenching filter S. The aforesaid centrifugal switch may be of the known type, comprising masses synchronously rotating with the motor, or with a member driven by the motor, and adapted to operate electric contacts when predetermined rotation speeds are reached.

The end 2 of the main winding AP of the motor M is connected to the same terminal G1, not only through the ballast resistor Rz, the filter FM, the thermal switch E, the contact group 11, 12 and 13 and the fuse F1, but also through an additional resistor Ra.

A second single-pole, double-throw switch C is operatively associated with said centrifugal switch and is adapted to control the insertion and the removal of the thermal switch E and the additional resistor Ra in the feeding circuit of the motor windings.

A brief description of the operation of the circuit illustrated in the drawing will now be furnished.

At the beginning, when the motor is stopped, the different movable contacts are positioned as shown in the drawings.

For starting the motor, the contacts 11 are closed by a proper key of the keyboard of the teleprinter, a second contact set 12 associated for example with the control mechanism of the line feed operation permits the same starting operation. It should be noted that, when the motor is started, the contacts 13 of a time switch remain closed to assure the feeding of the motor when the manual starting contacts 11 and 12 are no longer actuated. In particular, the time switch is adapted to maintain the contacts 13 closed for a predetermined time after the last character has been set up on the keyboard or received by the teleprinter.

Therefore, in a first phase of the starting period the main winding AP of the motor is fed through the fuse F1, the contact 11 or 13, the thermal switch E and the contacts C2–C3 of the speed governor, this latter in this initial position shortcircuiting the filter FM and the resistors Rz and Ra. In this first phase the auxiliary winding AA of the motor M is in turn fed through the fuse F1, the contact 11, 12 or 13, the thermal switch E, the filter FM, the contacts S1 of the centrifugal switch, and the capacitor C'.

It is therefore clear that in this first phase the resistor Ra is removed, with the purpose of increasing the starting torque of the motor. In the meanwhile the resistor Rz remains shortcircuited by the contacts S1.

When the motor has reached a predetermined speed, for example 2,200r.p.m., the double-throw switch C of the centrifugal governor changes position so starting a second phase wherein the terminals C1 and C2 make and the terminals C2 and C3 break. Consequently, in this second phase the additional resistor Ra is series connected wit the main winding AP of the motor M, while the auxiliary winding AA is fed as in the first phase.

The motor continues to accelerate until, having reached a speed for example of 2,500r.p.m., the contacts S1 of the centrifugal switch break, thus inserting the ballast resistor Rz into the feeding circuit of both windings AP and AA of the motor.

The insertion of the resistor Rz produces a decrease of the current in the windings AP and AA of the motor and therefore a slowing down of the motor. When, in the slowing down operation the motor reaches a speed such that the contacts S1 and S2 make again, the resistor Rz is removed again, whereby the motor starts to accelerate again, and so on.

The above-mentioned system of regulation of the motor speed by means of a ballast resistor Rz cooperating with the contacts S1 of the centrifugal governor tends to produce intolerable variation phenomena in the motor speed. In fact in the phases wherein, in consequence of the operation of the contacts S1, the current changes in the two windings AP and AA, the variations are very more remarkable in the winding AP than in the winding AA, as in the latter the capacitor C' tends to quench the current variations. The differential variation of the current in the winding AP with respect to the current in the winding AA produces a rotary field which is superposed over the main rotary field, so causing the oscillating in the motor speed variations.

According to a characteristic of the invention it has been found that the insertion of the additional resistor Ra connected in the manner previously described is particularly adapted to reduce these oscillating variations.

The necessity to quench these variations is particularly important in the event of application to a teleprinter, as then without the use of the resistor Ra the variations reach such frequencies and intensity as to produce distortions in the individual binary signals acted on by the machine.

The operation of the thermal switch is substantially similar to the one described in the U.S. Pat. No. 2,387,646. In this connection, it should be noted that the single phase motors for low power, as that considered herein, exhibit the characteristic of drawing an amount of current from the line which differs little between the running motor condition and the stalled motor condition. The little difference between these two currents makes very difficult protection of the motor in the stalled motor condition, as the protective devices found on the market are not sufficiently sensitive.

In the described circuit that disadvantage is obviated since the bimetal plate element E3 controlling the contacts of the thermal switch E is operative only at the low speeds of the motor, being shortcircuited by the contacts C1, C3 at the high speeds.

It will be evident that many changes could be made in the embodiment disclosed without departure from the invention. Accordingly, the invention is not to be considered limited to the disclosed embodiment, but rather only by the scope of the appended claims.

We claim:

1. Speed regulating apparatus for a split-phase motor, said motor having first and second stator windings connected across the power input terminals, said second winding being connected to one of said power input terminals by means of a reactance having a value which will cause a rotary field to be generated in said motor, said motor being constructed to drive external apparatus at a speed between a first predetermined speed and a higher second predetermined speed, comprising:

first resistance means, first speed responsive switch means for placing said first resistance means in series with said first winding when the speed of operation of said motor exceeds said first predetermined speed, said first resistance means being of a value such that said motor will continue to accelerate upon the application of a power input thereto and after said first resistance means has been placed in series with said first winding, second resistance means, and second speed responsive switch means constructed to make and break at said second predetermined speed and for placing said second resistance means in series with said windings, when the speed of operation of said motor exceeds said second predetermined speed, said second resistance means being of a value such that the speed of operation of said motor will decrease after said second means is placed in series with said windings.

2. The apparatus defined in claim 1 wherein said second switch means includes at least a pair of contacts which make and break upon the operation of said second switch means, said apparatus further comprising filter means coupled to said contacts for quenching sparks occurring thereacross.

UNITED STATES PATENT OFFICE
CERTIFICATE OF CORRECTION

Patent No. 3,588,646               Dated June 28, 1971

Inventor(s)    Giovanni Zaffignani, et al

It is certified that error appears in the above-identified patent and that said Letters Patent are hereby corrected as shown below:

Column 1, lines 11 and 12, "oscillating in the motor speed variations" should read -- oscillating variations in the motor speed --.

Column 2, lines 65 and 66, "oscillating in the motor speed variations" should read -- oscillating variations in the motor speed --.

Signed and sealed this 21st day of March 1972.

(SEAL)
Attest:

EDWARD M. FLETCHER, JR.            ROBERT GOTTSCHALK
Attesting Officer                  Commissioner of Patents